United States Patent
Durst et al.

[11] Patent Number: 6,125,815
[45] Date of Patent: Oct. 3, 2000

[54] METHOD AND DEVICE FOR CONVERTING HEAT INTO WORK

[75] Inventors: Franz Durst; Miroslaw Weclas, both of Langensendelbach, Germany

[73] Assignee: Invent GmbH—Entwicklung Neuer Technologien, Uttenreuth, Germany

[21] Appl. No.: 09/198,835

[22] Filed: Nov. 24, 1998

[30] Foreign Application Priority Data

Dec. 2, 1997 [DE] Germany .......................... 197 53 407

[51] Int. Cl.⁷ .................................................. F02B 1/08
[52] U.S. Cl. ................................... 123/298; 123/527
[58] Field of Search .................. 123/298, 527, 123/270, 272, 275, 280, 668, 669, 670

[56] References Cited

U.S. PATENT DOCUMENTS

| | | | |
|---|---|---|---|
| 1,260,408 | 3/1918 | Leisser | 123/298 |
| 1,276,083 | 8/1918 | Lake | 123/298 |
| 3,923,011 | 12/1975 | Pfefferle . | |
| 4,381,745 | 5/1983 | Firey . | |
| 4,480,613 | 11/1984 | Siewert | 123/298 |
| 5,425,236 | 6/1995 | Haerle | 123/670 |
| 5,609,297 | 3/1997 | Gladigow et al. | 123/298 |
| 5,613,471 | 3/1997 | Yaoita | 123/298 |

FOREIGN PATENT DOCUMENTS

| | | | |
|---|---|---|---|
| 481754 | 9/1929 | Germany | 123/298 |
| 43 22 109 A1 | 1/1995 | Germany . | |

*Primary Examiner*—Erick Solis
*Attorney, Agent, or Firm*—Pearne & Gordon LLP

[57] ABSTRACT

The invention relates to a method for converting heat into work, a gaseous fuel being compressed and subsequently burnt and a drive means 2 being moved due to volumetric expansion generated as a result of combustion. In order to allow low-pollutant combustion, there is provision, according to the invention, for the compressed gaseous fuel to be burnt in a porous body 8.

33 Claims, 8 Drawing Sheets

METHOD AND DEVICE FOR CONVERTING HEAT INTO WORK

The invention relates to a method and a device for converting heat into work.

According to the prior art, it is known, for the purpose of converting heat into work, to utilize the volumetric expansion generated as a result of the combustion of a compressed gaseous fuel, such as an air/fuel mixture, in order to obtain mechanical work: In the gasoline engine, a piston is moved away from the cylinder head due to the volumetric expansion caused as a result of the ignition of an air/fuel mixture compressed in the cylinder. This movement is transmitted to a crankshaft via a connecting rod.

In the known method, combustion takes place, with a flame being formed. This results in the following disadvantages:

a) Inter alia, harmful $NO_x$, gases occur as combustion gases.
b) Combustion is incomplete and inefficient because of a usually insufficient distribution and mixing of the air/fuel mixture in the combustion chamber.
c) Due to incomplete combustion, harmful soot occurs as a combustion residue.
d) For reasons of environmental protection, cost-intensive catalytic cleansing of the combustion gases or separation of the combustion residues from the exhaust gas stream is necessary.

DE 43 22 109 A1 discloses a burner for the combustion of a gas/air mixture. The combustion chamber is filled with a porous body. The heat generated by the burner is discharged, for example, as hot water or steam and can be used in further processes for heating or for operating turbines. The efficiency achieved in using the known burner for producing work is relatively low due to the need for providing a heat exchanger. Another disadvantage is that the known burner can be operated only continuously and with low fuel density. The use of liquid fuel is not possible as a consequence of the method.

The object of the present invention is to specify a method and a device for converting heat into work which eliminate the abovementioned disadvantages. The aim of the invention is, furthermore, to convert heat into work in as cost-effective a way as possible, so that the conversion efficiency is improved and the combustion gases are as clean as possible.

This object is achieved by means of the features of claims 1 and 15. Expedient developments may be gathered from the features of claims 2 to 14 and 16 to 33.

In conformity with the method according to the invention, there is provision for the combustion of the compressed gaseous fuel to take place in a porous body. The surprisingly successful flameless combustion of a compressed gaseous fuel in a porous body brings about complete low-pollutant combustion. There is no need for cost-intensive catalytic cleansing of the combustion gases or for the separation of combustion residues from the exhaust gas stream. Heat can thereby be converted into work with high efficiency and, in particular, using liquid fuel which can be handled easily, such as light fuel oil, gasoline and the like.

According to one design feature, the gaseous fuel is preheated prior to combustion in the porous body. The heat transmitted to the porous body during preceding combustion is expediently utilized for this purpose.

The preheating of the gaseous fuel brings about particularly homogeneous distribution and contributes to complete low-pollutant combustion.

According to a further design feature, the porous body is connected to a compression chamber. The porous body may, for example, fill the combustion chamber in engines known according to the prior art, such as gasoline, diesel, Wankel engines or the like.

Air or the gaseous fuel may be supplied directly to the compression chamber. It is also possible, however, to supply air or the gaseous fuel to the compression chamber through the porous body. In this case, even while the air or the gaseous fuel is being supplied into the compression chamber, it is preheated in the porous body which is preheated as a result of preceding combustion.

The air or the gaseous fuel is subsequently transferred into the porous body, whilst at the same time being compressed. Compression gives rise to further heating.

According to a further design feature, the air/fuel mixture may be produced outside the porous chamber, for example in a carburetor. Insofar as essentially air has been transferred from the combustion chamber into the porous body, the air/fuel mixture may also be produced within the porous body, in that the fuel is supplied directly to the latter. This may be carried out, for example, by the injection of liquid fuel under high pressure. In this case, the fuel is advantageously evaporated in the porous body. Once again, the heat transmitted to the porous body during preceding combustion may be utilized for this purpose. Evaporation brings about homogeneous mixing of the fuel with the compressed air. The gaseous fuel is preferably an air/fuel mixture or a combustible gas, such as propane or butane.

According to a further advantageous design feature, the gaseous fuel can be mixed with combustion gases in the porous body. It is also possible to mix air or gaseous fuel with combustion gases outside the porous body, preferably in the compression chamber. Mixing with the hot combustion gases achieves further preheating of the air or of the gaseous fuel. The combustion gases are subjected to further combustion. As a result, harmful combustion residues which have possibly remained are destroyed. Particularly clean combustion is achieved.

According to a particularly advantageous feature, the combustion gases, when being emitted from the compression chamber, are led through the porous body and, at the same time, subjected to a thermal reaction. As a result of the thermal reaction which follows combustion, harmful combustion gases are destroyed. In this case, advantageously, the heat transmitted to the porous body during preceding combustion is used for carrying out the thermal reaction.

It is also possible for the combustion gases to be emitted directly from the compression chamber. This is appropriate, above all, when a particularly low-residue fuel is used.

It is preferred to use liquid fuel, for example alcohol, gasoline, light fuel oil and the like, as fuel. Finally, it may also be envisaged to use a dustlike solid, for example coal dust, mixed with air.

According to a further solution, in a device for converting heat into work, there is provision for the combustion of the compressed gaseous fuel to take place in a porous body. The surprisingly successful flameless combustion of a compressed gaseous fuel in a porous body brings about complete low-pollutant combustion. There is no need for cost-intensive catalytic cleansing or for the separation of combustion residues from the exhaust gas stream of combustion gases. Heat can thereby be converted into work with high efficiency and, in particular, using liquid fuel which can be handled easily, such as light fuel oil, gasoline and the like.

The embodiments already described with regard to the method may also be applied to the device. In addition, the following further embodiments are worth mentioning:

An intake port having at least one intake orifice opening into the compression chamber or into the porous body may be provided. The intake port serves for the supply of air or gaseous fuel. An exhaust port having at least one exhaust orifice opening into the compression chamber or into the porous body may likewise be provided. The exhaust port serves for the discharge of combustion gases. Both the intake orifice and the exhaust orifice may be closed by means of a cyclically controlled closing device, for example a valve capable of being actuated via a camshaft. If the intake orifice opens into the porous body, air or the gaseous fuel which is supplied flows through the porous body. Since the porous body has been heated during preceding combustion, the air or the gaseous fuel is preheated. If the exhaust orifice opens into the porous body, the combustion gases, when being emitted from the compression chamber, are led through the hot porous body and, at the same time, subjected to a thermal reaction, that is to say second combustion. The thermal reaction causes harmful combustion gases which have possibly formed to be destroyed.

A drive means provided for conversion into mechanical work may have a piston, a rotary piston or a turbine rotor. Insofar as a piston is concerned, the compression chamber is expediently delimited by a cylinder, closed on one side by means of a cylinder head, and by a piston movable in reciprocating motion. In this case, the porous body may be attached to the cylinder head, a heat-insulating layer, preferably produced from ceramic, being advantageously provided between the porous body and the cylinder head.

According to a further design feature, the porous body may extend, projecting radially outward, from the compression chamber in the vicinity of the intake orifice and/or exhaust orifice. A porous body designed in this way is preferably formed by a radially continuous recess in the cylinder head. Furthermore, it is possible for the porous body to be provided on the piston head, preferably in a recess provided on the piston head. In this case, it has proved expedient to provide a device for cooling the piston head. By means of the device, for example oil can be sprayed onto the piston head underside located opposite the porous body.

According to a further design feature, the porous body has a communicating porous chamber. It may preferably be produced from metal, in particular high-grade steel or ceramic, such as aluminum oxide, aluminum nitride, zirconium oxide, titanium oxide, silicon carbide or the like. In order to optimize the flow conditions, the porous body may have a plurality of layers with a different average pore diameter.

The gaseous fuel may be an air/fuel mixture or a combustible gas. It is also possible to use a mixture consisting of a dustlike solid, such as coal dust, and air.

According to a further design feature, a device for producing air/fuel mixture [sic] may be provided outside the porous body. This may be a carburetor. A device for supplying fuel into the compression chamber or into the porous body may expediently be provided. This may be a nozzle connected to an injection pump.

Exemplary embodiments of the invention are explained in more detail below with reference to the drawing in which.

FIGS. 1 to 8 show a diagrammatic cross sectional view through a cylinder 1 of a first internal combustion engine. A piston 2 received displaceably in the cylinder 1 is at top dead center. An intake port 3 opens with an intake orifice 4 into a compression chamber 5. An exhaust port 6 opens with an exhaust orifice 7 into a porous body 8. The porous body 8 fills essentially the space which remains between a cylinder head 9 and the piston 2 which is at top dead center. The intake orifice 4 can be closed by means of an intake valve 10 and the exhaust orifice 7 by means of an exhaust valve 11.

FIGS. 8 to 14 illustrate a diagrammatic cross sectional view through the cylinder 1 of a second internal combustion engine. The porous body 8 is provided, here, in a radially continuous recess 13 which is formed in the cylinder head 9 and which is located in the vicinity of a single intake and exhaust orifice 12. A conical orifice face 14 connects the porous body 8 to the compression chamber 5. The conical orifice face 14 widens in the direction of the compression chamber 5. The piston 2 has a central projection 16 on the piston head 15. The geometry of the piston head 15 corresponds to the geometry of the compression chamber 5, so that, at top dead center, the contour of the piston head 15 is located in the vicinity of the contour of the compression chamber 15. A single intake and exhaust valve 17 is provided for closing the intake and exhaust orifice 12.

The porous body 8 has a radially inner layer 8a having a first pore diameter and a radially outer layer 8b having a second pore diameter. The second pore diameter is greater than the first pore diameter.

Figure 15:
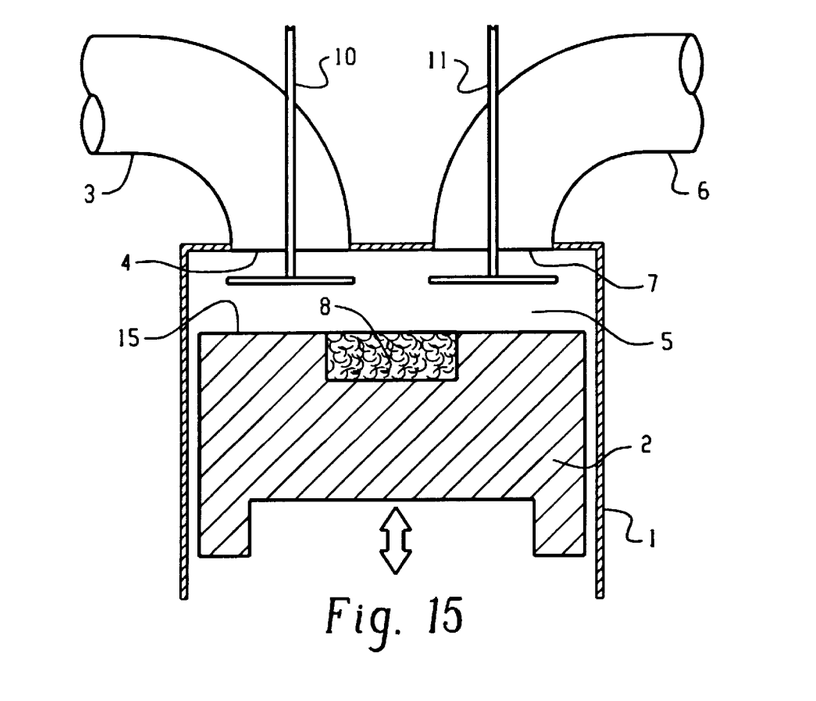
FIG. 15 shows a diagrammatic cross sectional view through the cylinder of a third internal combustion engine.

FIG. 15 shows a diagrammatic cross sectional view through the cylinder 1 of a third internal combustion engine. Here, the porous body 8 is formed in a central depression provided on the piston head 15. The depression is filled completely with the porous body 8.

Here, the porous body 8 moves in reciprocating motion together with the piston 2. In order to counteract overheating of the piston head 15, a device (not illustrated here) is provided, by means of which oil is sprayed onto the crankshaft-side underside of the piston 2.

Figure 1:
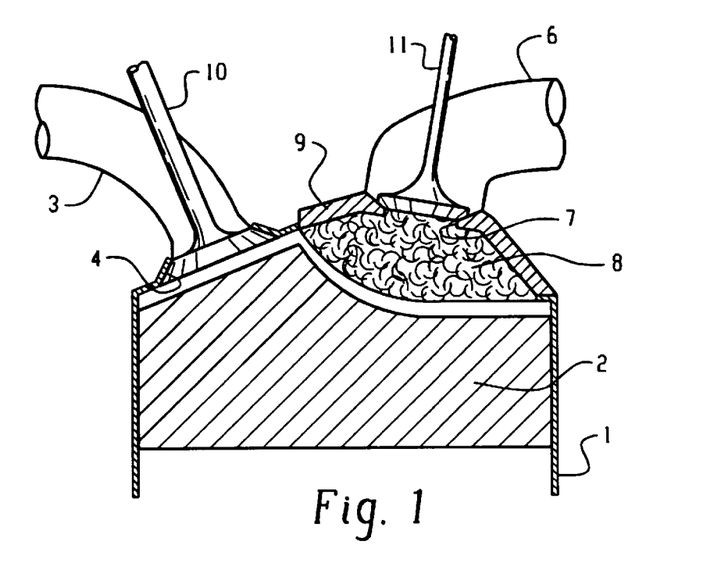
FIG. 1 shows a diagrammatic cross sectional view through the cylinder of a first internal combustion engine, the piston being at top dead center.
Figure 2:
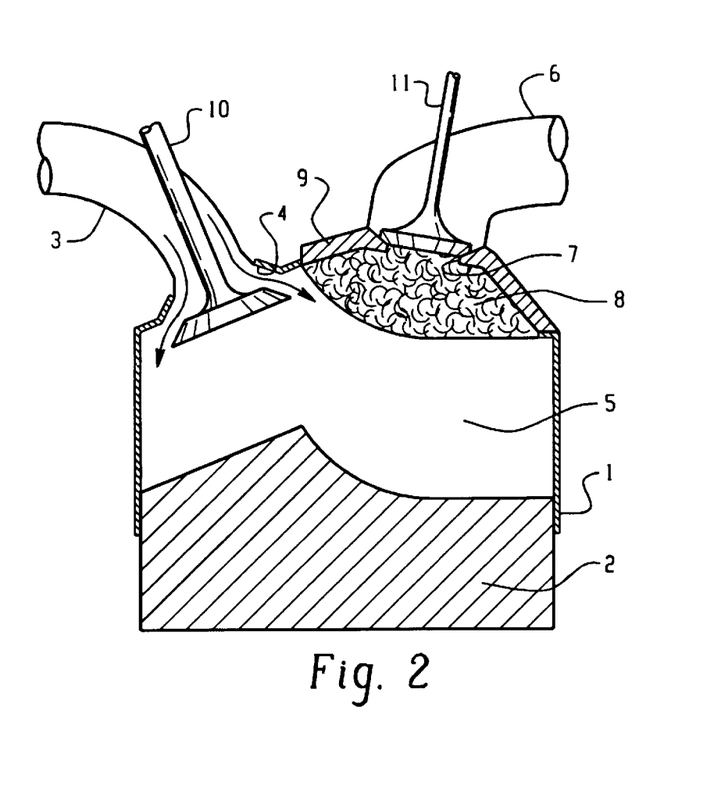
FIG. 2 shows the cross sectional view according to FIG. 1 during the suction stroke.
Figure 3:
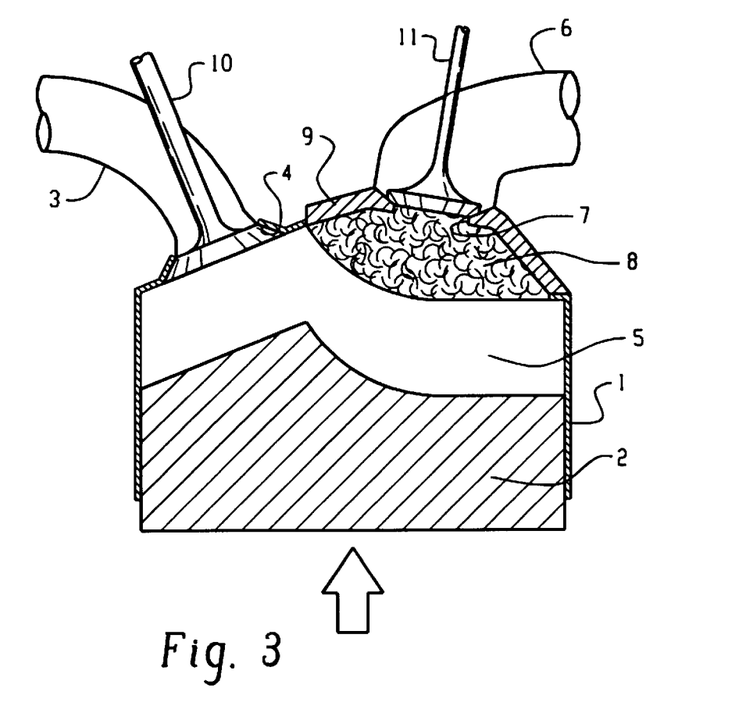
FIG. 3 shows a diagrammatic cross sectional view according to FIG. 1 during the compression stroke.
Figure 4:
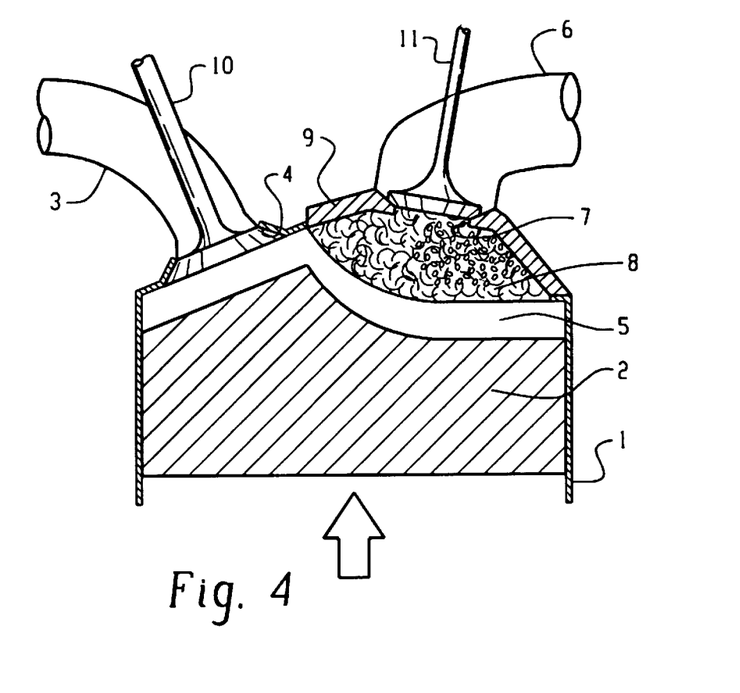
FIG. 4 shows a diagrammatic cross sectional view according to FIG. 1 during the compression stroke and in the case of fuel injection.
Figure 5:
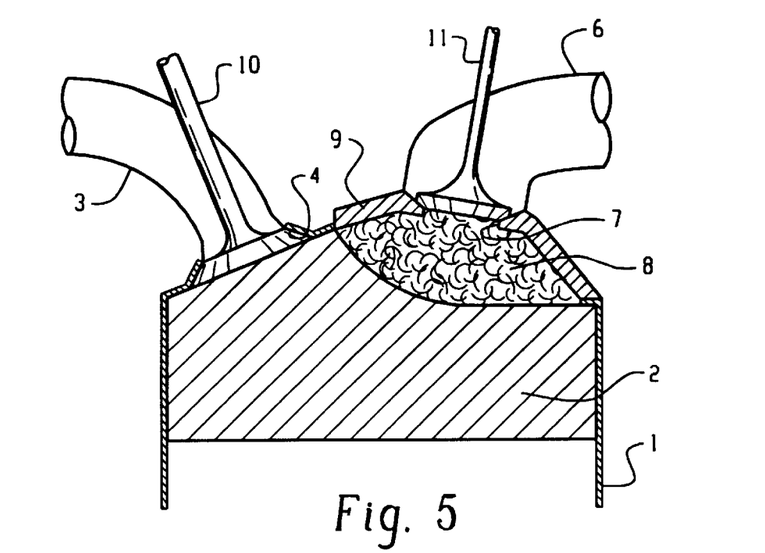
FIG. 5 shows a diagrammatic cross sectional view according to FIG. 1 at the end of the compression stroke and during ignition.
Figure 6:
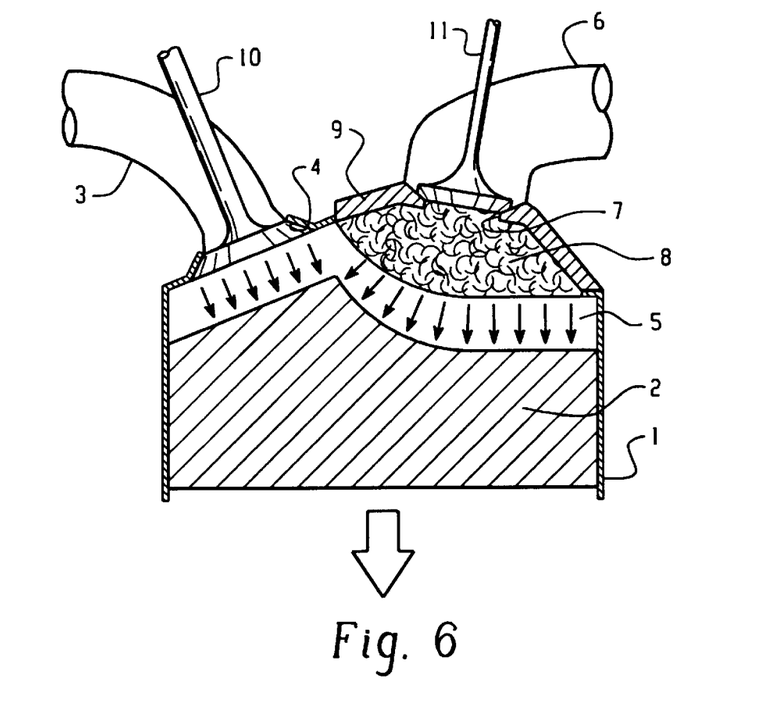
FIG. 6 shows a diagrammatic cross sectional view according to FIG. 1 during the working stroke.

The first thermal engine shown in FIGS. 1 to 8 functions as follows:

During the suction stroke shown in FIG. 2, the piston 2 moves away from the cylinder head 9. The intake valve 10 is opened. As a result of the vacuum formed in the cylinder 1, air is sucked through the intake orifice 4 into the compression chamber 5. The intake valve 10 is then closed and the piston 2 moved in the direction of the cylinder head 9. In this case, the air sucked in is compressed and simultaneously forced into the porous body 8. This so-called compression stroke is shown in FIG. 3. Shortly before top dead center is reached, liquid fuel is injected into the porous body 8, as is clear from FIG. 4. The injected liquid fuel evaporates due to the action of the heat stored in the porous body 8 during preceding combustion. A highly turbulent air/fuel mixture is obtained. This highly turbulent air/fuel mixture is further compressed and heated until the piston 2 reaches top dead center. This situation is illustrated in FIG. 5. Compression, in particular, ensures that, at top dead center, the ignition temperature of the air/fuel mixture is exceeded. Spontaneous ignition and flameless combustion of the air/fuel mixture in the porous body 8 occur. The volumetric expansion caused thereby presses the piston 2 away from the cylinder head 9. This so-called working stroke is shown in FIG. 6.

Figure 7:
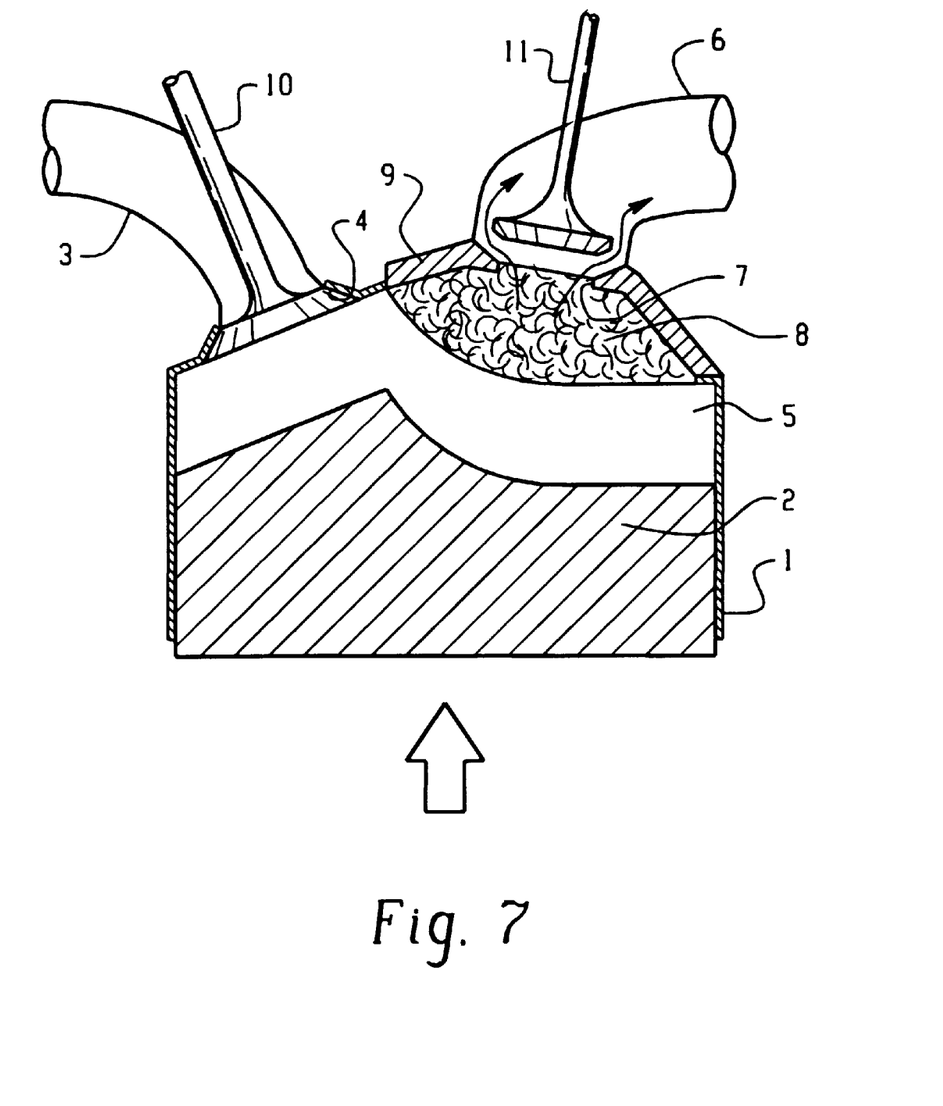
FIG. 7 shows a diagrammatic cross sectional view according to FIG. 1 during the emission stroke.
Figure 8:
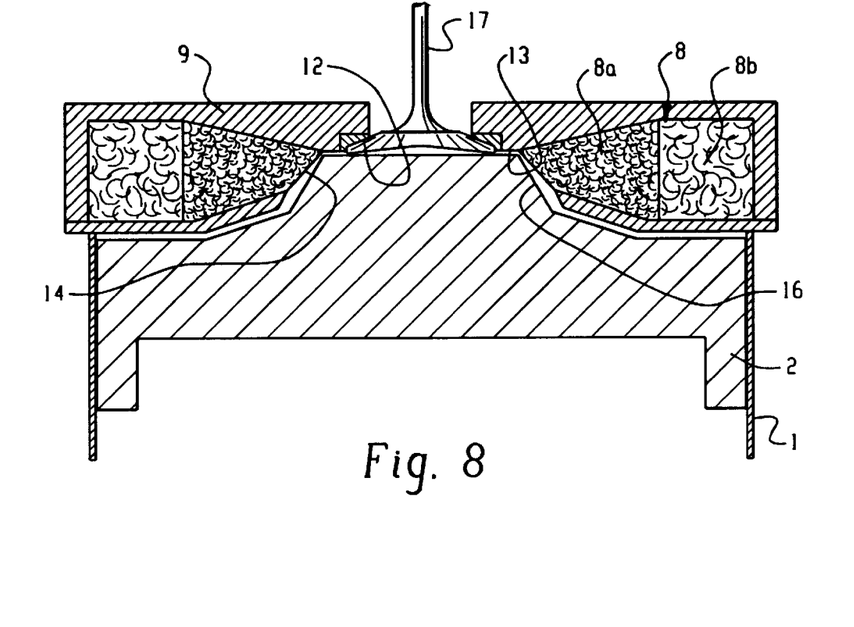
FIG. 8 shows a diagrammatic cross sectional view through the cylinder of a second internal combustion engine, the piston being at top dead center.

FIG. 7 shows the emission stroke. In this case, the piston 2 moves once again in the direction of the cylinder head 9. The exhaust valve 11 is opened. The combustion gases are forced through the hot porous body 8 into the exhaust port 6. When they are passing through the porous body 8, the combustion gases are subjected to a thermal reaction. During this time, harmful combustion gases are destroyed. The combustion gases, cleansed, leave the porous body 8. The exhaust valve 11 is subsequently closed again, and a new workcycle commences with an intake stroke.

During continuous operation, the combustion gases which have remained in the porous body 8 from respectively preceding combustion serve for heating the air/fuel mixture. These combustion gases are subjected to second combustion. This, too, contributes to particularly low pollutant combustion.

Figure 9:
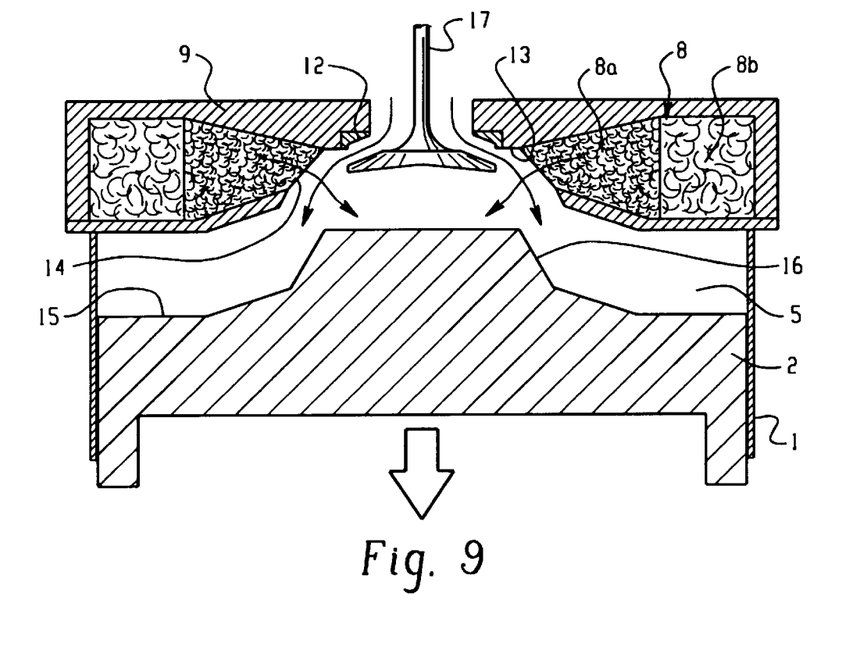
FIG. 9 shows a diagrammatic cross sectional view according to FIG. 8 during the suction stroke.
Figure 10:
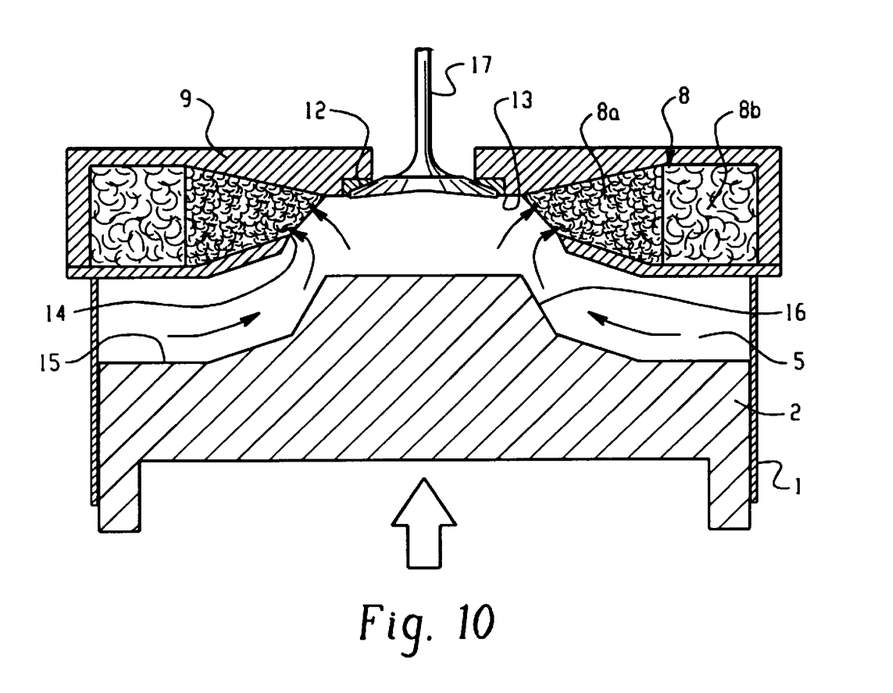
FIG. 10 shows a diagrammatic cross sectional view according to FIG. 8 during the compression stroke.
Figure 11:
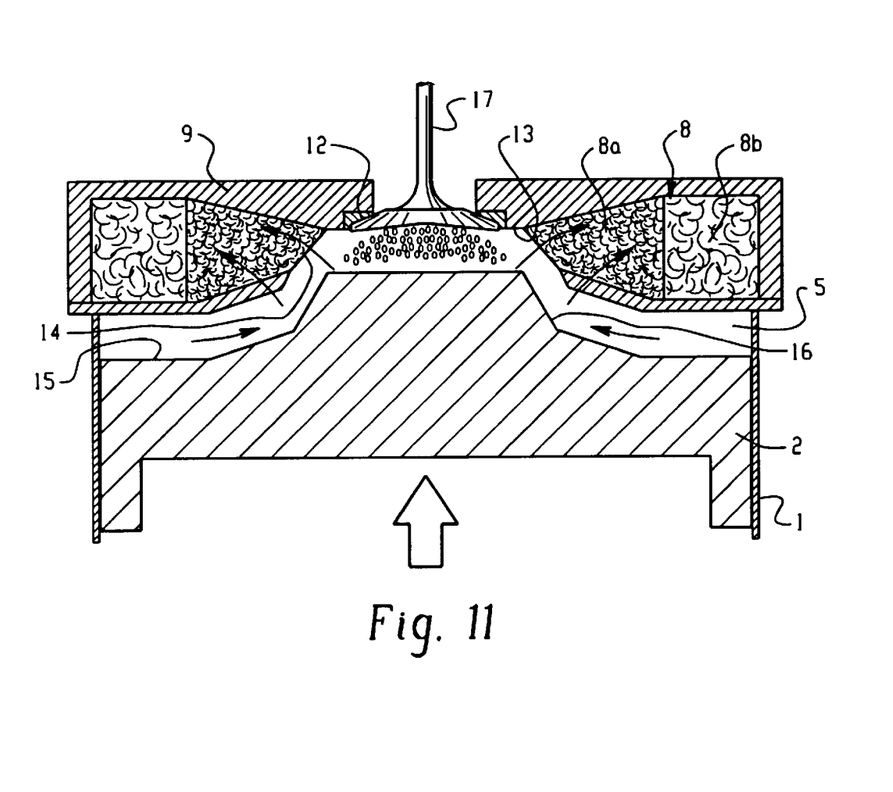
FIG. 11 shows a diagrammatic cross sectional view according to FIG. 8 during the compression stroke and in the case of fuel injection.
Figure 12:
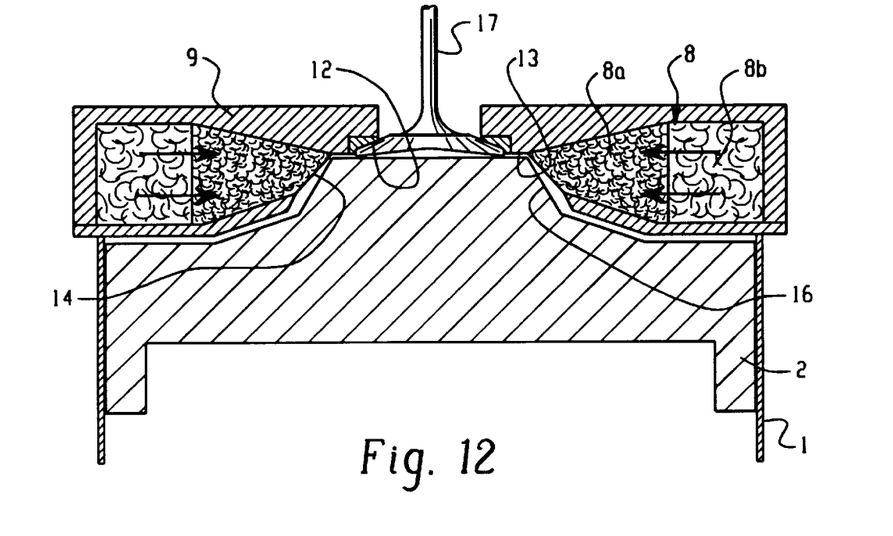
FIG. 12 shows a diagrammatic cross sectional view according to FIG. 8 at the end of the compression stroke and during ignition.
Figure 13:
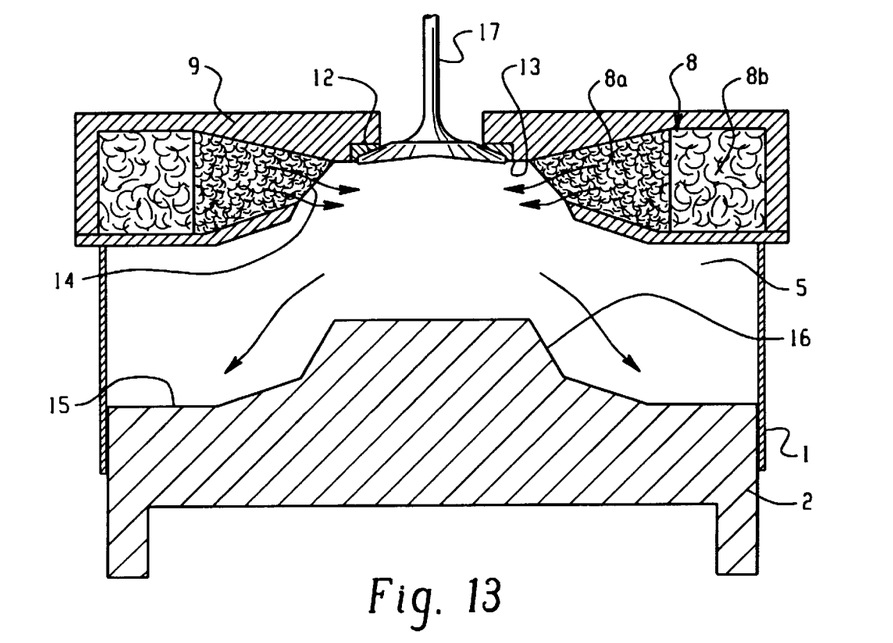
FIG. 13 shows a diagrammatic cross sectional view according to FIG. 8 during the working stroke.
Figure 14:
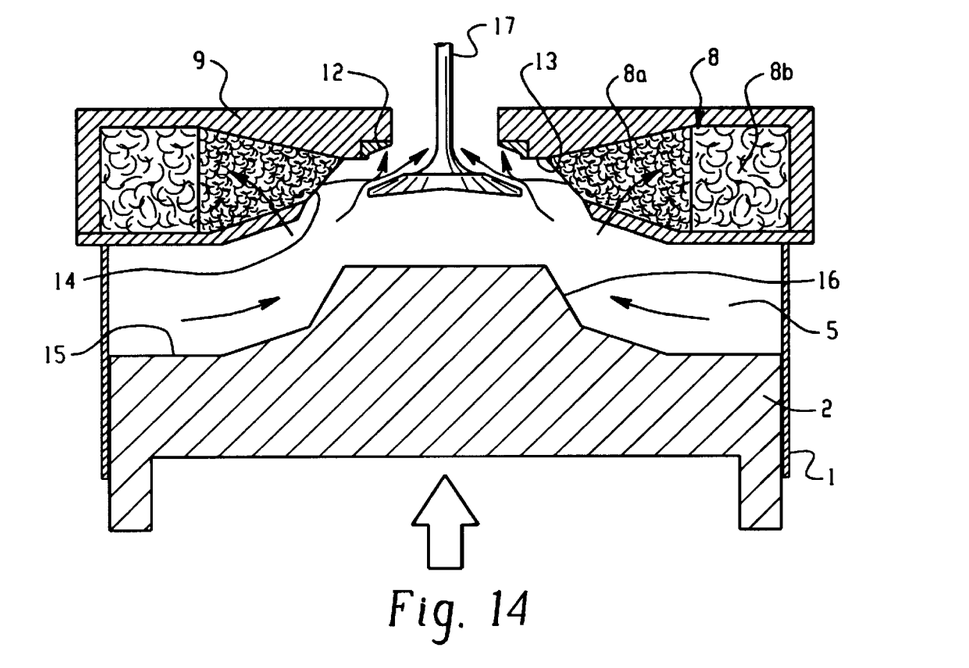
FIG. 14 shows a diagrammatic cross sectional view according to FIG. 8 during the emission stroke.

The second thermal engine shown in FIGS. 8 to 14 functions as follows:

During the suction stroke shown in FIG. 9, the single intake and exhaust valve 17 is opened. Air is sucked through the intake orifice 4 into the compression chamber 5. Combustion gases which have remained from preceding combustion are simultaneously sucked out of the porous body 8 into the compression chamber 5. During the compression stroke shown in FIG. 10, the single intake and exhaust valve 17 is closed and the piston 2 is moved in the cylinder 1 in the direction of the cylinder head 9. The mixture consisting of air and combustion gases is compressed and is forced into the porous body 8. Liquid fuel is then injected into the compression chamber 5, as shown in FIG. 11. A highly turbulent air/fuel mixture is formed, which, when compressed further, is forced into the porous body 8 and ignites automatically there (see FIG. 12).

As a result of the volumetric expansion which occurs at the same time, the combustion gases are transferred from the porous body 8 into the compression chamber 5. The piston 2 simultaneously moves away from the cylinder head 9. This is shown diagrammatically in FIG. 13.

The emission stroke then follows. As is clear from FIG. 14, the single intake and exhaust valve 17 opens. The piston 2 simultaneously moves in the direction of the cylinder head 9. The combustion gases are forced out of the combustion chamber 5. A small portion of the combustion gases enters the porous body 8 during the emission stroke. This portion of the combustion gases is subjected to further combustion during the next cycle.

In the third thermal engine shown in FIG. 15, the porous body 8 is provided in the piston head 15. This variant is suitable, in particular, when an air/fuel mixture or a combustible gas produced outside the compression chamber 5 is used.

| List of reference symbols | |
| --- | --- |
| 1 | Cylinder |
| 2 | Piston |
| 3 | Intake port |
| 4 | Intake orifice |
| 5 | Compression chamber |
| 6 | Exhaust port |
| 7 | Exhaust orifice |
| 8 | Porous body |
| 8a | Inner layer |
| 8b | Outer layer |
| 9 | Cylinder head |
| 10 | Intake valve |
| 11 | Exhaust valve |
| 12 | Intake and exhaust orifice |
| 13 | Recess |
| 14 | Orifice face |
| 15 | Piston head |
| 16 | Projection |
| 17 | Intake and exhaust valve |

What is claimed is:

1. Method for converting heat into work, a gaseous fuel being compressed and subsequently burnt in a combustion chamber and a volumetric expansion caused as a result of combustion being utilized to obtain mechanical work, characterized in that the combustion of the compressed gaseous fuel takes place in a porous body (8) filling the combustion chamber.

2. Method according to claim 1, the gaseous fuel being preheated prior to combustion in the porous body (8).

3. Method according to claim 1 or 2, the porous body (8) being connected to a compression chamber (5).

4. Method according to claim 3, at least one of air or the gaseous fuel being supplied directly to the compression chamber (5).

5. Method according to claim 3, at least one of air or the gaseous fuel being supplied to the compression chamber (5) through the porous body (8).

6. Method according to claim 3, at least one of air or the gaseous fuel being transferred from the compression chamber (5) into the porous body, whilst at the same time being compressed.

7. Method according to claim 1, the gaseous fuel being mixed with combustion gases in the porous body (8).

8. Method according to claim 3, at least one of air or the gaseous fuel being mixed with combustion gases outside the porous body (8).

9. Method according to claim 3, the combustion gases, when emitted from the compression chamber (5), being led through the porous body (8) and, at the same time, being subjected to a thermal reaction.

10. Method according to claim 3, the combustion gases being emitted directly from the compression chamber (5).

11. Method according to claim 1, at least one of an air/fuel mixture or a combustion gas being used as the gaseous fuel.

12. Method according to claim 11, the air/fuel mixture being produced essentially outside the porous body (8).

13. Method according to claim 11, the air/fuel mixture being produced essentially within the porous body (8), in that the fuel is supplied directly to the porous body (8).

14. Method according to claim 1, the fuel being evaporated in the porous body (8).

15. Device for converting heat into work, a gaseous fuel capable of being compressed and of subsequently being burnt in a combustion chamber and the volumetric expansion caused during combustion being capable of being converted into mechanical work, characterized in that the combustion of the gaseous fuel takes place in a porous body (8) filling the combustion chamber.

16. Device according to claim 15, the gaseous fuel being capable of being preheated prior to combustion in the porous body (8).

17. Device according to claim 15 or 16, the porous body (8) being connected to a compression chamber (5).

18. Device according to claim 17, an intake port (3) having at least one intake orifice (4) opening into at least one of the compression chamber (3) or into the porous body (8) being provided.

19. Device according to claim 18, an exhaust port (6) having at least one exhaust orifice (7) opening into at least one of the compression chamber (5) or into the porous body (8) being provided.

20. Device according to claim 15, a drive means provided for converting heat into work having one of a piston (2), a rotary piston or a turbine rotor.

21. Device according to claim 17, the compression chamber (5) being delimited by a cylinder (1), closed on one side by means of a cylinder head (10), and by a piston (2) movable in reciprocating motion.

22. Device according to claim 21, the porous body (8) being attached to the cylinder head (10).

23. Device according to one of claims 21 or 22, a heat-insulating layer, being provided between the porous body (8) and the cylinder head (10).

24. Device according to claim 19, the porous body (8) projecting radially outward, extending from the compression chamber (5) in the vicinity of at least one of the intake orifice (4) and/or exhaust orifice (7).

25. Device according to claim 15, a means for igniting the gaseous fuel in the porous body (8) being provided.

26. Device according to claim 22, the porous body (8) being provided on a piston head (15) of the piston (2).

27. Device according to claim 26, a device for cooling the piston head (15) being provided.

28. Device according to claim 15, the porous body (8) having a communicating porous chamber.

29. Device according to claim 22, the porous body (8) being produced from one of ceramic or metal.

30. Device according to claim 15, the porous body (8) having a plurality of layers (8a, 8b) with a different average pore diameter.

31. Device according to claim 15, the gaseous fuel being at least one of an air/fuel mixture or a combustible gas.

32. Device according to claim 31, a device for producing the air/fuel mixture being provided outside the porous body (8).

33. Device according to claim 17, a device for supplying fuel into at least one of the compression chamber (3) or into the porous body (8) being provided.

* * * * *